UNITED STATES PATENT OFFICE.

FRANK FORSTER RENWICK, OF BRENTWOOD, AND OLAF BLOCH, OF LONDON, ENGLAND, ASSIGNORS TO ILFORD LIMITED, OF ILFORD, ENGLAND.

COLOR-SENSITIZED PHOTOGRAPHIC MATERIAL.

1,372,548.   Specification of Letters Patent.   Patented Mar. 22, 1921.

No Drawing.   Application filed November 21, 1918. Serial No. 263,592.

*To all whom it may concern:*

Be it known that we, FRANK FORSTER RENWICK, a subject of the King of England, and OLAF BLOCH, a subject of the King of England, residing at Brentwood, in Essex, England, and London, in England, respectively, have invented certain new and useful Improvements in Color-Sensitized Photographic Materials, of which the following is a specification.

This invention is for improvements in or relating to color sensitized photographic materials, and has for its object to provide material which shall have either a different or greater color-sensitiveness than has heretofore been obtainable.

In our concurrent patent application Serial No. 263,591, we have described means for obtaining a plate having either a different or a greater color-sensitiveness than those at present existing by means of using a dye of the auramin class which is defined in the said specification as the auramin or iminodiphenyl methane class, *i. e.* substitution derivatives of benzophenoneimid.

The chemical formula for the principal member of the class is $(N(CH_3)_2C_6H_4)_2=C=NH$, and it is to be understood that one or both of the two dimethylamido groups may be replaced by hydrogen or organic radicals, and that any one or more of the remaining nine hydrogen atoms in this typical compound may be replaced by another atom or group such as chlorin, the amido group, the ethyl group and others to form new dyes of this class.

According to the present invention, the color-sensitized material comprises a light-sensitive emulsion containing a dye of the auramin class as defined, together with one or more dyes of the isocyanin class, such for example as the pinacyanol, obtained by heating an alcoholic solution of quinaldin ethiodid, with or without quinolin ethiodid, with aqueous sodium hydrate in presence of formaldehyde. The sensitized material so produced possesses valuable photographic properties such as improved color-sensitiveness with freedom from fog, and good keeping properties.

The choice of the isocyanin dye or dyes added to that of the auramin class depends upon the effect required. For example, with the above isocyanin dye improved red and green sensitiveness is obtained and also new sensitiveness to deep red is produced which is not found with this pinacyanol alone.

The proportions of the dyes used are similar to those already employed for color-sensitizing materials, for example if a dry plate is to be sensitized by the bathing process, it may be immersed for three or four minutes in a bath composed of 100,000 ccs. of water, 2 grms. of the dye of the auramin class, and 2 grms. of the isocyanin dye.

If the dyes are to be mixed with the melted emulsion, then from .005 to .025 grms. of each dye is used per liter of emulsion.

As is well-known when two dyes are used together the usual effect is to produce a plate having features corresponding to both dyes though frequently the effect of one or the other is markedly diminished. However, with combinations of auramin and the above mentioned pinacyanol and other combinations of the same two classes, the character of the sensitiveness is changed and improved, it not being such as would be expected, but usually different from and much greater than the sum of the effects of the separate dyes, moreover other valuable photographic qualities are introduced or improved, *e. g.* cleanliness, good keeping properties.

It will be understood that in the bathing process the usual variations consist in the substitution of some alcohol for some of the water and the addition of some ammonia may be made.

It has previously been proposed to use auramin in the emulsion as a yellow filter in the manufacture of a self-screened or non-filter orthochromatic plate, but this proposal was made prior to the date of discovery of the isocyanin dyes and its sensitizing action was then unknown, moreover, the dye was used in such quantity as to, and solely for the purpose of reducing the action of blue light on the plate in the same way as tartrazin and other yellow dyes are used in making self-screened or non-filter orthochromatic plates; again, auramin has no apparent color-sensitizing effect when used with dyes of the eosine group, or with any other color-sensitizing dye known at the time when the aforesaid proposal was made.

In some cases it may be desired to use the dye of the auramin or iminodiphenyl methane class in sufficiently large proportions, for example 20 grms. to the 100,000 ccs. bath instead of 2 grms. or .25 grms. per liter of emulsion instead of .005 to .025 grms. to operate as a screen as well as a sensitizer, as it is found that when such dye is thus employed in conjunction with the isocyanin dyes, it still markedly improves the color sensitiveness conferred, as well as having a screening effect.

The term "isocyanins" in the specification and claims is to be interpreted in the same sense as it was used in the early days of the discovery of these dyes (*vide* Sheppard and Mees book: "*Theory of the Photographic Process*" 1907), that is to say, as the class of light sensitizing dyes derived from quinaldin (2-methyl quinolin). This class comprises not only compounds of the type of ethyl red, but also compounds such as pinacyanols, for example quinaldin-blue, which is obtained in one way by the action of alkali in the presence of formaldehyde on quinaldin ethiodid.

The various terms used in the claims are used in accordance with the definitions herein given, which definitions represent their accepted meaning both scientifically and chemically.

What we claim as our invention and desire to secure by Letters Patent is:—

1. A color sensitizing material, comprising a light sensitive emulsion containing a dye of the auramin or iminodiphenyl methane class, together with a dye of the isocyanin class, substantially as described.

2. A color sensitizing material substantially as described comprising a light sensitive emulsion containing a dye of the auramin, or iminodiphenylmethane class, together with that isocyanin dye which is obtained when an alcoholic solution of quinaldin ethiodid is heated with aqueous sodium hydrate in presence of formaldehyde.

In testimony whereof we have signed our names to this specification in the presence of two subscribing witnesses.

FRANK FORSTER RENWICK.
OLAF BLOCH.

Witnesses:
A. M. HAYWARD,
HARRY L. LEIDYL.